US011039596B2

(12) United States Patent
Pan et al.

(10) Patent No.: US 11,039,596 B2
(45) Date of Patent: Jun. 22, 2021

(54) CLIMATIZED PET CONTAINER

(71) Applicant: ATEMITO PTE. LTD., Singapore (SG)

(72) Inventors: Yu Min Pan, Singapore (SG); Leong Chye Lee, Singapore (SG); Günther W. Diekhöner, Bremen (DE); Jens Groth, Bremen (DE); Daniel Krause, Cleebronn (DE); Joachim Peuckert, Cleebronn (DE); Rob Cuzner, Victoria (AU); Jack Magree, Victoria (AU); Giles Matthews, Victoria (AU)

(73) Assignee: ATEMITO PTE. LTD, Singapore (SG)

( * ) Notice: Subject to any disclaimer, the term of this patent is extended or adjusted under 35 U.S.C. 154(b) by 162 days.

(21) Appl. No.: 16/333,486

(22) PCT Filed: Sep. 18, 2017

(86) PCT No.: PCT/SG2017/050468
§ 371 (c)(1),
(2) Date: Mar. 14, 2019

(87) PCT Pub. No.: WO2018/056903
PCT Pub. Date: Mar. 29, 2018

(65) Prior Publication Data
US 2019/0230894 A1 Aug. 1, 2019

(30) Foreign Application Priority Data

Sep. 22, 2016 (EP) .................................... 16190236

(51) Int. Cl.
*A01K 1/02* (2006.01)
*A01K 1/015* (2006.01)

(52) U.S. Cl.
CPC .......... *A01K 1/0245* (2013.01); *A01K 1/0158* (2013.01)

(58) Field of Classification Search
CPC .. A01K 1/0245; A01K 1/0158; A01K 1/0272; A01K 1/034; A01K 1/0076;
(Continued)

(56) References Cited

U.S. PATENT DOCUMENTS 3,490,417 A * 1/1970 Swinney ................ B65D 11/20
119/496
5,016,926 A 5/1991 Sharp et al.
(Continued)

FOREIGN PATENT DOCUMENTS

EP 2090158 A1 8/2009
JP S3014965 U 10/1985
(Continued)

*Primary Examiner* — Magdalena Topolski
*Assistant Examiner* — Katelyn T Truong
(74) *Attorney, Agent, or Firm* — Seed IP Law Group LLP (57) ABSTRACT

A pet container for transporting pets, in particular for air shipment of pets, comprising an outer shell having a top portion and a bottom portion, wherein the outer shell defines a pet chamber for accommodating a pet, wherein the outer shell has an opening formed therein for providing access to the pet chamber and a door for opening and closing the opening, and a climate compartment for receiving a cooling or heating medium therein, wherein the climate compartment is provided below the pet chamber and has an orifice for horizontally inserting a cooling or heating medium into and removing a cooling or heating medium from the climate compartment.

14 Claims, 9 Drawing Sheets

(58) Field of Classification Search
CPC ............... A01K 1/0082; A01K 1/0356; Y10T 292/0969; Y10T 292/097; Y10T 292/0997; Y10T 292/0834; Y10T 292/0836; Y10T 292/0846; Y10S 292/63
See application file for complete search history.

(56) References Cited

U.S. PATENT DOCUMENTS

| | | | |
|---|---|---|---|
| 5,727,503 A | 3/1998 | Whittaker | |
| 5,979,364 A * | 11/1999 | Ricketts | A01K 1/0236 119/496 |
| 6,647,925 B1 * | 11/2003 | Waiters | A01K 1/0245 119/453 |
| 6,783,162 B1 * | 8/2004 | Harper | A01K 1/0245 292/336.3 |
| 7,730,740 B2 | 6/2010 | Keller | |
| 8,584,618 B1 | 11/2013 | Batson et al. | |
| 9,095,120 B1 | 8/2015 | Skaggs | |
| 2003/0127060 A1 * | 7/2003 | Yeung | A01K 1/0254 119/497 |
| 2009/0118869 A1 * | 5/2009 | Cauchy | A01K 1/0245 700/276 |
| 2010/0043720 A1 * | 2/2010 | Yelverton | A01K 1/0245 119/496 |
| 2010/0319627 A1 * | 12/2010 | Cauchy | F24F 5/0042 119/500 |
| 2011/0005466 A1 | 1/2011 | Furth | |
| 2013/0092090 A1 * | 4/2013 | McCallum | A01K 1/0356 119/74 |
| 2014/0069340 A1 * | 3/2014 | Lipscomb | A01K 7/02 119/74 |
| 2016/0192615 A1 * | 7/2016 | Parness | A01K 5/01 119/454 |
| 2018/0184615 A1 * | 7/2018 | Ho | A01K 1/0356 |
| 2018/0263211 A1 * | 9/2018 | Veness | A01K 1/0356 |

FOREIGN PATENT DOCUMENTS

| | | |
|---|---|---|
| JP | 64-010179 U | 1/1989 |
| JP | 02-049851 U | 4/1990 |
| JP | H0591309 U | 12/1993 |
| JP | 2001148955 A | 6/2001 |
| JP | 2007037447 A | 2/2007 |
| JP | 3187073 U | 10/2013 |

* cited by examiner

CLIMATIZED PET CONTAINER

BACKGROUND

Technical Field

The present invention relates generally to a pet container for transporting pets, in particular for air shipment of pets.

More specifically, the present invention relates to a pet container for transporting pets, in particular for air shipment of pets, comprising an outer shell having a top portion and a bottom portion, wherein the outer shell defines a pet chamber for accommodating a pet, wherein the outer shell has an opening formed therein for providing access to the pet chamber and a door for opening and closing the opening, and a climate compartment for receiving a cooling or heating medium therein.

Description of the Related Art

The International Air Transport Association (IATA) has created rules regarding approved types of containers for cats, dogs and other pet animals flying in cabin and as cargo. Generally, the cargo area is climate-controlled such that a pet may travel safely while on the aircraft. It may occur, however, that a pet ends up waiting on the tarmac while the cargo is loaded or unloaded. This wait on the tarmac can be the most dangerous to pets. Further, the heat on the tarmac can heat up the cargo hold quickly. Thus, the risk to a pet is when it is on the ground, not when the aircraft is in the air. To ensure that pets are not exposed to extreme heat or cold in the pet holding areas, terminal facilities, when moving the pets between terminal and aircraft or on an aircraft awaiting departure, some airlines have established temperature restrictions. For example, pets will not be accepted by most airlines when the current or forecasted temperature at the arrival, layover or departure airport is above 29° C. at any location on the itinerary.

Even though a pet may be exposed to significant temperature variations during the time before, between and after getting on and off an aircraft, the IATA requirements do not provide for a cooling or heating system to be present on or in a pet container.

U.S. Pat. No. 9,095,120 B1 discloses pet container of the above-mentioned type, comprising an upper portion and a lower portion. The upper portion and the lower portion join together to define a pet chamber to house a pet. The upper portion includes a cooling media compartment above the pet chamber. The cooling media compartment is in fluidic communication with the pet chamber to provide hydration to the pet housed in the pet container. A lid is hingedly connected to the cooling media compartment. The lid forms an upper wall of the cooling media compartment.

Although U.S. Pat. No. 9,095,120 B1 addresses the need to provide a pet container which allows the cooling or heating up of a pet depending on the ambient temperature, the pet container disclosed in U.S. Pat. No. 9,095,120 B1 builds relatively high, making it inconvenient to transport. Moreover, the latches which securely fasten the lid to the cooling media compartment have to be strong enough for the connection between the lid and the remainder of the pet container to sustain the weight of the pet container and its entire content. Implementing the required rigidity of the components of the pet container of U.S. Pat. No. 9,095,120 B1 increases their complexity, weight and cost. Further, due to the presence of ventilation holes in the pet container of U.S. Pat. No. 9,095,120 B1, the cooling or heating effect is deteriorated by warm or cold air flowing into the pet container from the outside and mixing with the air inside the pet chamber cooled or heated up by the climate compartment.

US 2011/0005466 A1 discloses a pet container in which a cooling or heating system is provided in the form of a battery powered electric fan for blowing cool or hot air into the pet chamber. However, the cooling effect may be insufficient or stop altogether when the battery runs low or out of power. Further, a fan may become clogged or may otherwise stop working. In these instances, a pet may be subjected to undesirable low or high temperatures.

U.S. Pat. No. 7,730,740 B2 discloses a cooling pet bed that is suitable for use with a conventional pet container. To provide a cooling effect to a pet accommodated in a pet container, the pet bed is filled with a cooling medium, such as ice, and inserted into the pet container so that the pet can rest thereon. However, especially air shipment of a pet in a pet container may be a stressful experience for the pet. For this reason, it may not be safe to open the pet container to insert a cooling pet bed before the pet has fully acclimated to the situation.

BRIEF SUMMARY

Provided is a pet container for transporting pets, in particular for air shipment of pets.

Provided is a pet container of the above-mentioned type, wherein the climate compartment is provided below the pet chamber and has an orifice for horizontally inserting a cooling or heating medium into and removing a cooling or heating medium from the climate compartment.

The present invention allows the provision of a cooling or heating effect to a pet accommodated in a pet container during critical situations. For example, during unloading of the cargo of an airplane upon arrival at a destination with a critically high or low temperature, a pet in a pet container may remain in the cargo hold or on the tarmac for an extended amount of time. This may put the pet at risk for injuries and illnesses related to the high or low temperatures. For example, dogs may suffer from heart stroke at critically high temperatures or hypothermia at critically low temperatures. In such critical situations, personnel of the airline or the airport can insert one or more conventional cooling or heating pads into the climate compartment of the pet container of the present invention. Conventional cooling or heating pads are readily and cheaply available in most places of the world and may easily be held at the disposal of airport personnel for the purpose of the present invention. Additionally or alternatively, the climate compartment may be filled with any other suitable cooling or heating medium.

Placing the climate compartment below the pet chamber at the bottom portion of the pet container takes account of the fact that pets, such as dogs and cats, release or receive heat primarily through their paws and abdomen, and cool or heat up from the bottom up. Further, during high ambient temperatures, the arrangement of the climate compartment below the pet chamber reduces its exposure to direct sunlight, leading to a prolonged time during which a cooling effect can be provided to the pet inside the pet container as compared with an arrangement of the climate compartment above the pet chamber.

Due to the arrangement of the climate compartment below the pet chamber, a cooling or heating medium is inserted into or removed from the climate compartment via the orifice in a horizontal manner. Thus, the climate compartment extends horizontally. A horizontal direction refers to a direction which is substantially parallel to the bottom portion of the pet container or the ground on which the pet container is arranged.

To form the climate compartment, additional wall elements are arranged at the bottom portion or the bottom rather than the top portion or top of the pet container. This lowers the center of gravity of a pet container compared to a pet container having a climate compartment above the pet chamber. Bringing the center of gravity of a pet container closer towards the bottom portion of the pet container results in a more stable pet container compared to when the center of gravity is higher.

Moreover, the construction of the pet container is facilitated when the climate compartment is arranged at the bottom portion or bottom of the pet container rather than at the top portion thereof. Besides the bottom portion or bottom providing the climate compartment, other components of the pet container may remain unaltered. In contrast to a pet container having the climate compartment located above the pet chamber, there is no need to reinforce fastening elements or wall portions of the top portion of the pet container. A pet container of the present invention is thus less complex and more cost efficient than a pet container with a climate compartment arranged at the top of the pet container.

The cold or hot temperature of the cooling or heating medium is transferred to the outer shell, in particular to the bottom wall portion on or inside which it is placed. The pet inside the pet chamber may either be placed directly on the bottom wall portion or may be separated therefrom by means of a tray inserted into the pet chamber for the pet to rest on. By arranging the climate compartment at the bottom portion or bottom of the pet container, both heat convection and heat conduction are effective in cooling or heating up a pet. In contrast, when the climate compartment is placed at the top portion of the pet container, only heat convection provides a cooling or heating effect to the pet.

Preferably, the climate compartment is not fluidly connected to the pet chamber but is completely distinct from the pet chamber. This facilitates cleaning of a pet container.

The outer shell is preferably constructed of non-toxic materials, such as fiberglass, metal, rigid plastics, weld metal mesh, solid wood or plywood.

To prevent the climate compartment from becoming soiled or the cooling or heating medium from slipping out of the climate compartment, the outer shell may comprise a cover for opening and closing the orifice. Thus, the climate compartment of a pet container may be accessible from the outside via a cover in the bottom portion of the outer shell. The door of the pet container need not be opened to insert one or more conventional cooling or heating pads. Instead, the climate compartment may be accessible through the specially provided cover which, when opened, allows direct access to the climate compartment.

Generally, the outer shell has a front wall portion, a rear wall portion, a first side wall portion, a second side wall portion, a top wall portion and a bottom wall portion. The cover may be hingedly connected to the bottom of the bottom wall portion of the pet container. In this way, when inserting a cooling or heating medium into the climate compartment, the cover is maintained in the open position by gravitational force and need not be held open manually.

Alternatively, the climate compartment may be adapted to receive at least one tray, wherein the tray may be adapted to accommodate at least one cooling or heating medium. The tray may be of a substantially rectangular shape, but other shapes are also possible. The tray may be provided with a cover plate on one side thereof, the cover plate being adapted to provide a closure for the orifice of the climate compartment when the tray has been slid inside the climate compartment. In the inserted state, the cover plate of the tray preferably forms a smooth surface with the outer shell of the pet container. The climate compartment may be adapted to receive two trays arranged side-by-side. The trays may be partitioned into multiple compartments to receive a plurality of cooling or heating mediums. The partitioning walls may be made of insulating foam.

According to a preferred embodiment, the climate compartment extends across the entire bottom wall portion of the outer shell in order to achieve a large cooling or heating effect. When the climate compartment is arranged at the bottom portion of the outer shell, it may extend from the bottom wall portion into at least one of the first and second side wall portions and the front and rear wall portions of the outer shell.

According to another preferred embodiment, the orifice opens towards one of the first and second side wall portions because the first and second side wall portions of the pet container generally have a larger longitudinal extension than the front and rear wall portions. This facilitates insertion of a cooling or heating medium.

The climate compartment may comprise a slot for receiving a wireless device for tracking the location of the pet container. Thus, if desired, a pet owner may be informed about the current location of his or her pet at any time during its travel. Additionally or alternatively, the outer shell of the pet chamber may be provided with an indentation for receiving a wireless tracking device. The indentation may be accessible from the inside of the pet chamber and arranged at the top portion of the outer shell.

The door of the pet container generally has an open state and a closed state. In the open state, the door gives free the opening so that a pet may enter the pet chamber. In the closed state, the door closes the opening. Typically, in the closed state, the door lies substantially flush with the outer shell. The closed state may be a locked state or an unlocked state. In the locked state, the pet may neither enter nor leave the pet chamber, wherein in the unlocked state, the door may, without significant exertion of force, be moved into the open state. For example, if the door is hingedly connected to the outer shell, the door may be pivoted into the open and closed states.

Preferably, the pet container comprises a lock indicator to indicate whether the door is in the locked or unlocked state. For instance, a green cue may indicate that the door is in its locked state such that a pet cannot leave the pet chamber, while a red cue may indicate that the door is in its unlocked state such that a pet is free to leave the pet chamber. A lock indicator may be provided on the door of the pet container, but may alternatively be provided elsewhere on the outer shell of the pet container.

According to an aspect of the present invention which may be claimed independently, the door may be secured in its locked state to prevent accidental opening of the door of the pet container. In particular, according to a preferred embodiment, the door comprises a spring loaded door latch for transferring the door between the locked state and the unlocked state. The door latch may comprise a pair of pins. Each pin may be provided with an actuating member having a nose portion. In the locked state of the door, the pins may protrude beyond the door so as to engage with the outer shell and the nose portions may be spaced apart from one another. The door latch may further comprise a securing member for securing the door in the locked state. The securing member may comprise a flap that is hingedly connected to the door and has a bulge portion. The bulge portion may be configured to be received between the nose portions in the locked state of the door so as to secure the door in the locked position. Thus, the locked state of the door may be a secured locked state or an unsecured locked state. Securing the door of a pet container in the locked state is particularly advantageous during air shipment, when other freight may interfere with the pet container, which may cause the door of the pet container to become dislodged and spring open. This poses a serious risk on both the pet and its environment which may be significantly reduced by equipping the door latch with a securing member.

Vibrational noise of the door in the closed state may be prevented by covering a rim, which forms the opening in the pet container, with a flexible lining. The door may snugly fit in the flexible lining of the rim in its closed state. The flexible lining may be rubber or a rubber-like material so as to be sufficiently resilient to damp vibrational movements of the door. Instead of a flexible lining, bumpers could be used. The bumpers can be evenly distributed around the opening of the pet container or around the door and made of a material as described in connection with the flexible lining.

According to a further preferred embodiment, which may also be claimed independently, the outer shell has a replenishment opening at the top portion. In the closed state of the door, the replenishment opening may be in fluid communication with a water tank provided on an inner side of the door. To prevent soiling of the replenishment opening, a lid may be hingedly connected to the outer shell for opening and closing the replenishment opening.

Alternatively, the replenishment opening may be adapted to receive a dispenser coupled to the water tank. The dispenser may be a slide-out tray. The water through may then be topped up irrespective of whether the door is in the open or closed state.

According to a preferred embodiment, which may also be claimed independently, the outer shell has a ventilation arrangement comprising at least an inner panel and an outer panel, each of the inner and outer panels having a plurality of ventilation holes, wherein the ventilation holes of the inner panel overlap with the ventilation holes of the outer panel to an extent of less than 30%, preferably less than 20%. In other words, at least two panels with ventilation holes may be arranged behind each other such that the passage of air through a ventilation hole of one panel is significantly blocked by the other panel. In this way, the length of the flow path of air passing through the ventilation holes of the two panels is increased compared with panels having ventilations holes that are substantially aligned with one another and do not cause the air flow to be diverted when passing through the ventilation holes. This effect may be used to reduce the intensity of sound penetrating into the pet chamber through the ventilation arrangement. For instance, the intensity of sound may be reduced by 3 db. The noise pollution during air shipment is considerably high such that any attenuation of the noise level reduces the stress a pet is subjected to during travelling by air. Preferably, the panels are transparent such that a pet in the pet container may observe the outside therethrough.

The pet chamber may also be equipped with a reservoir containing fluids that have a soothing effect on a pet. For instance, the reservoir may comprise or be supplied with essential oils for the pet to inhale. Alternatively, a vaporizer could be used to expose the pet to the aroma dissipated by the vaporizer.

According to another embodiment, a tray may removably be provided inside the pet chamber. When inserted into the pet chamber, the tray may provide further reinforcement to the pet container. The tray may also be used to collect pet waste and therefore may aid in keeping the interior walls of the pet container in a clean state. A metallic tray may also improve the heat transfer between the cooling or heating medium inside the climate compartment and the pet inside the pet container. Thus, the tray may be placed in the lower part of the pet chamber which is surrounded by the bottom portion of the outer shell.

According to yet another preferred embodiment, the outer shell is at least partially formed of a multi-layered wall comprising a first wall and a second wall, which define a space therebetween. In particular, the outer shell may be double-walled. The space formed between the first wall and the second wall may be filled with air or a foam so as to improve the heat-insulating property of the outer shell. Preferably, the outer shell is completely formed of a multi-layered wall.

According to another embodiment, an inner helmet may be provided, which allows changing the volumetric size of a pet chamber of a pet container. More specifically, by inserting an inner helmet into a pet chamber of a pet container, its volumetric size may be reduced. In this way, the same pet container may be used for differently sized pets, such as for both dogs and cats.

Alternatively, especially when the pet chamber is to accommodate a cat, a partition member may be inserted into the pet chamber, such as in the top portion of the outer shell, to partition the space accessible for the cat or other pet within the pet chamber.

It will be appreciated that a pet container of the present invention may also be used with other modes of transportation, such as by car, bus or train, and may also function as a stationary pet kennel.

According to another, possibly independent aspect of the present invention, the pet container has a water replenishing system which comprises a water tank and a water tray. The water tray may be provided at least partially inside the pet chamber. The water tank may be in fluid communication with the water tray, wherein a valve is configured to control a maximum water level in the water tray. The replenishing system may be used to maintain a predefined depth of water in the water tray, such as a depth of water of around 20 mm, so that there will always be sufficient water in the water tray for the pet to drink from (provided, of course, that there is sufficient water in the water tank). If the animal drinks from the water tray or if the water spills from the water tray, the water will automatically fill up again to the predefined depth.

In a specific embodiment, water tray comprises an opening configured to fluidly connect the water tank with the water tray, and a float body configured to cooperate with the opening so as to form the valve. The float body may have a conical protrusion configured to seal the opening in the water tray. Additionally, the float body may have a plurality of protrusions movably received within guiding receptacles of the water tray.

BRIEF DESCRIPTION OF THE SEVERAL VIEWS OF THE DRAWINGS

Other objects and advantages of the present invention will appear from the following description taken in connection with the appended drawings, wherein.

DETAILED DESCRIPTION

It will be appreciated that like reference numerals are used to refer to generally like structure or features in each of the drawings. Differences between such elements will generally be described, as needed, but the same structure need not be described repeatedly for each figure as prior description may be referred to instead for purposes of clarity and conciseness.

A first embodiment of a pet container 10 will now be described with reference to FIGS. 1 to 6. The pet container 10 comprises an outer shell 100 having a top portion 102 and a bottom portion 104. The outer shell 100 further comprises a front wall portion 110, a rear wall portion 130 opposite the front wall portion 110, a first side wall portion 150, a second side wall portion 170 opposite the first side wall portion 150, a top wall portion 190 and a bottom wall portion 200 opposite the top wall portion 190. The outer shell 100 defines a pet chamber 20 that may accommodate a pet (not shown).

The pet container 10 has an opening 112 in the front wall portion 110. A door 30 is pivotally connected to the pet container 10 to open and close the opening 112. The opening 112 has a shape that allows a pet to enter the pet chamber 20 therethrough. The door 30 is pivotable about a pivot axis D. Pivot axis D is located at a first longitudinal end 30a of the door 30 and extends vertically in a direction from the top wall portion 190 to the bottom wall portion 200. Additionally, the door D may be detachably connected to the pet container 10. By detaching the door D from the pet container 10, it may be converted into a pet kennel.

The door 30, the rear wall portion 130 and the first and second side wall portions 150, 170 are each provided with a ventilation louver 32, 132, 152, 172. For ease of explanation, only the ventilation louver 32 will be described. It will be appreciated that the ventilation louvers 132, 152, 172 may be configured in accordance with the ventilation louver 32.

Ventilation louver 32 has a plurality of longitudinally extending slats 32a and slits 32b formed between vertically adjacent slats 32a. The slits 32b function as ventilation holes and are small enough to prevent escape or any part of the pet protruding with the resultant danger of injury.

The ventilation louver 32 covers most (e.g., more than 80%) of the surface area of the door 30. The ventilation louvers 132, 152, 172 cover about 50% of the surface area of the rear wall portion 130 and the first and second side wall portions 150, 170, respectively.

Figure 5:
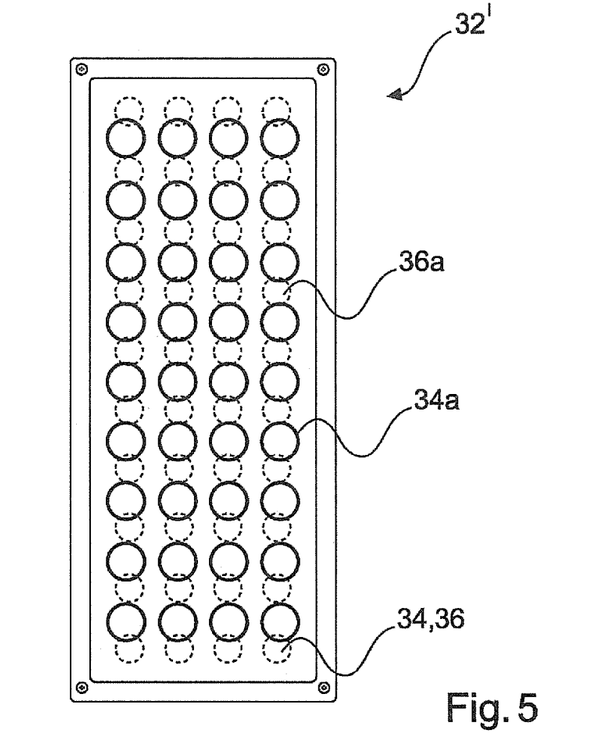
FIG. 5 shows a ventilation arrangement that may be used in a pet container of the present invention.

Instead of providing a ventilation louver 32 having a plurality of slats 32a and slits 32b, an alternative ventilation arrangement 32' having at least two panels 34, 36 spaced behind each other may be provided, as shown in FIG. 5. An inner panel 34 may face the pet chamber 20, wherein an outer panel 36 may face the outside of the pet container 10. Inner and outer panels 34, 36 are each provided with ventilation holes 34a, 36a. The two panels 34, 36 are so arranged that a significant portion (e.g., more than 50%) of the ventilation holes 34a, 36a does not overlap. This prevents air from flowing through the ventilation arrangement 32' on the shortest possible flow path. Instead, air is forced to flow through one of the ventilation holes 36a of the outer panel 36, change its flow direction and flow through one of the ventilation holes 34a of the inner panel 34. It will be appreciated that the ventilation holes 34a, 36a need not be of the same size or shape or be arranged in the same pattern on panels 34, 36. By increasing the flow path of air flowing through the ventilation arrangement 32', sound waves may be attenuated. Thereby, the noise level inside the pet chamber 20 may be noticeably reduced, e.g., by 3 db or more. This is advantageous, among others, in an airport environment which generally has relatively high noise levels, e.g., more than 70 db. It will further be appreciated that any one of the ventilation louvers 132, 152, 172 may be replaced by the ventilation arrangement 32'.

The ventilation louver 32 or the ventilation arrangement 32' may be provided with a mesh 38. The mesh 38 ensures that the pet has no surface or edge at which it can gnaw or scratch. The mesh 38 may be made from metal, such as steel. It will be appreciated that the ventilation louvers 132, 152, 172 may likewise be covered by a mesh, as shown in FIGS. 1 to 4.

The inner side 30d of the pet container 10 is smooth with no protrusions that the pet can bite or scratch to cause damage to the integrity of the pet container 10 in any way.

The outer shell 100 has a front circumferential section 210, an intermediate circumferential section 212 and a rear circumferential section 214. The intermediate circumferential section 212 may be provided by a rectangular-shaped conduit portion, the front circumferential section 210 may be provided by a first end cap having the door 30, and the rear circumferential section 214 may be provided by a second end cap. The uppermost and lowermost surfaces of the first and second end caps may form part of the top and bottom wall portions 190, 200, respectively. Similarly, the side surfaces of the first and second end caps may form part of the first and second side wall portions 150, 160. With respect to the front and rear circumferential sections 210, 214, the intermediate circumferential section 212 is indented along the top wall portion 190 and the first and second side wall portions 150, 170. This configuration of the outer shell 100 allows two pet carriers 10 to be stacked onto one another. The transition or step between the front circumferential section 210 and the intermediate circumferential section 212, and between the intermediate circumferential section 212 and the rear circumferential section 214 also prevents straps spanning the pet container 10 in a direction which is substantially parallel to the front or rear wall portions 110, 130 from sliding off the pet container 10.

Figure 1:
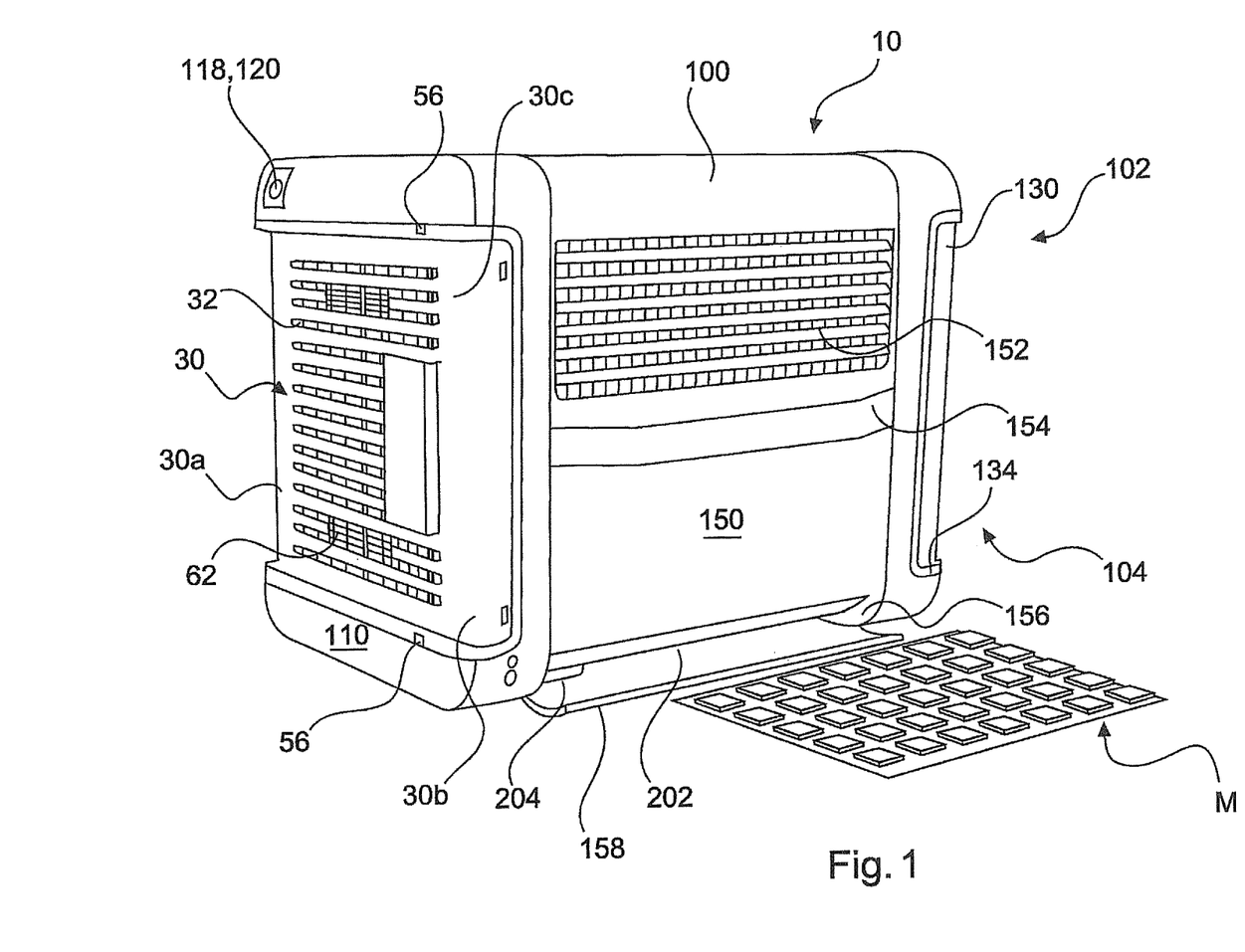
FIG. 1 shows a pet container according to a first embodiment of the present invention with the door in its closed and securely locked state.

A handle 192 is attached to the top wall portion 190. The top wall portion 190 comprises a depression 194 that allows the handle 192 to fit into top wall portion 190 in a flush manner. This assists in the stackability of multiple pet containers 10.

Figure 4:
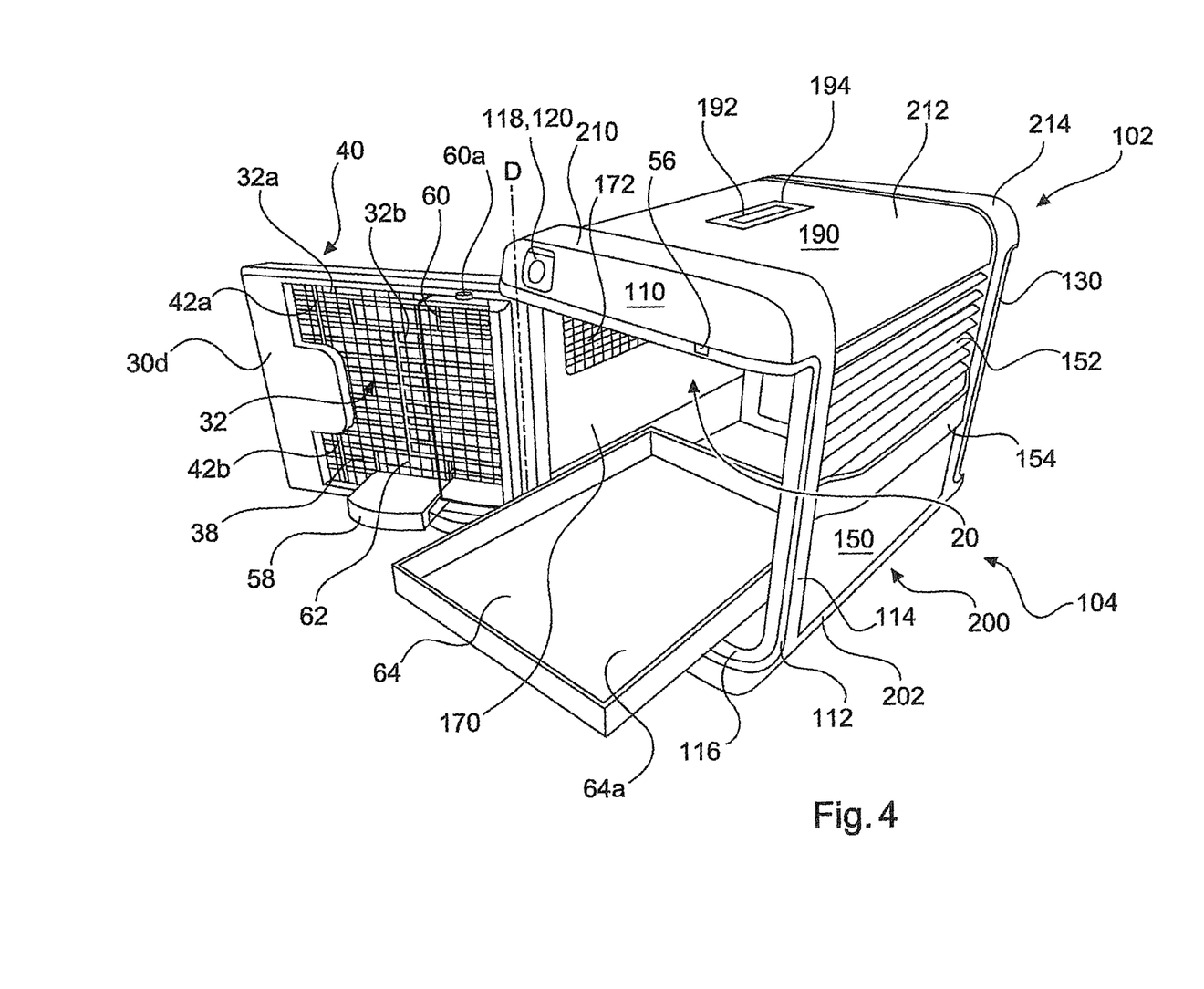
FIG. 4 shows the pet container of FIG. 1 with the door in its open state.

The first and second side wall portions 150, 170 are equipped with spacer bars, of which only the spacer bar 154 is visible in FIGS. 1 and 4. The spacer bars 154 allow the pet container 10 to be easily moved and prevent the ventilation louvers 32, 132, 152, 172 or the ventilation arrangement 32' from becoming blocked, such as by other freight. The spacer bars 154 are so configured that the fingers of a person handling the pet container 10 can slip in a space formed between the first and second side wall portions 150, 170 and the spacer bars 154 so as to lift the pet container 10.

A climate compartment 202 is formed in the bottom portion 104 of the outer shell 100. More specifically, the climate compartment 202 is formed in the bottom wall portion 200 of the outer shell 100. The climate compartment 202 may provide a cooling and/or heating effect to the pet container 10 and the pet chamber 20. The outer shell 100 has an orifice 156 in the bottom portion 104 to allow direct access to the climate compartment 202. The climate compartment 202 is preferably not fluidly connected to the pet chamber 20. The orifice 156 opens towards the first side wall portion 150.

As shown in FIG. 1, a lid 158 is located at a boundary between the first side wall portion 150 and the bottom wall portion 200 to open and closes the orifice 156 so as to provide horizontal access to the climate compartment. The lid 158 is pivotally connected to the bottom wall portion 200. The lid 158 may be locked via a TSA lock. The climate compartment 202 may extend over substantially the whole of the bottom wall portion 200. Further, the orifice 156 may extend along the entire longitudinal extension of the first side wall portion 150.

A cooling or heating medium M may be horizontally inserted into or removed from the climate compartment 202 through the orifice 156. The cooling or heating medium M may be a conventional cooling or heated pad for pets. Preferably, ice is not filled into the climate compartment 202 since the ice may melt and leak through orifice 156.

The door 30 is located laterally inwardly from a rim 114 forming the opening 112. The rim 114 is covered with a lining 116. The lining 116 may be made from rubber or a rubber-like material. In its closed state, the door 30 is seated within the lining 116 so as to reduce or eliminate vibrations of the door 30 and resulting noise, which may occur during handling or transportation of the pet container 10. The rear wall portion 130 is designed similarly to the front wall portion 110. More specifically, a section corresponding to the door 30 is likewise located laterally inwardly from a fringe 134 formed in the rear wall portion 130.

Figure 2:
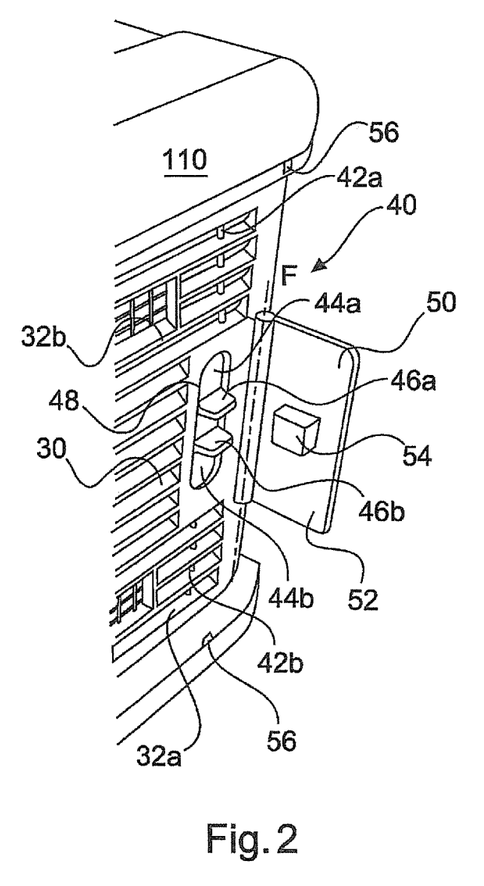
FIG. 2 shows the pet container of FIG. 1, wherein the door is in its closed and unsecured locked state.
Figure 3:
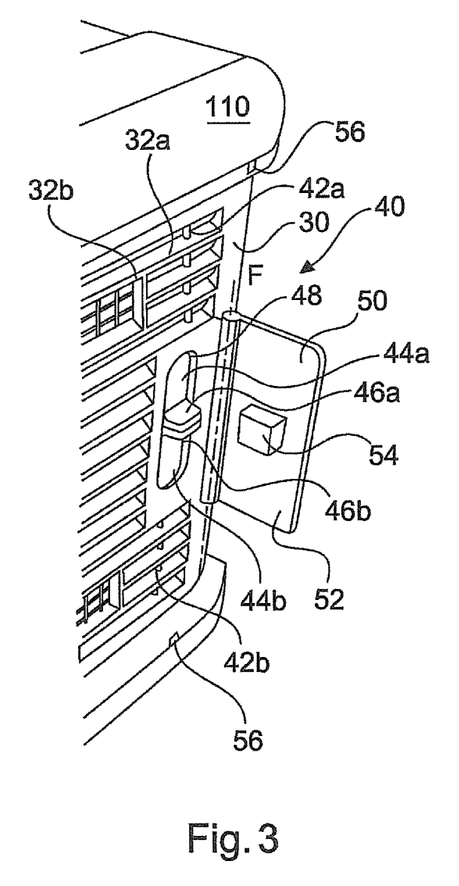
FIG. 3 shows the pet container of FIG. 1, wherein the door is in its closed and unlocked state.

The door 30 has a spring loaded door latch 40. The door latch 40 comprises a pair of pins 42a, 42b which extend vertically between the top wall portion 190 and the bottom wall portion 200. As shown in FIGS. 2 and 3, each pin 42a, 42b is provided with an actuating member 44a, 44b which has a nose portion 46a, 46b. The nose portions 46a, 46b protrude through a first aperture 48 in the door 30 in a direction away from the pet chamber 20.

The pins 42a, 42b are biased to extend beyond the door 30 so that, in a locked state of the door 30, the pins 42a, 42b are received in respective openings (not shown) provided in the outer shell 100. In the locked state of the door 30, the nose portions 46a, 46b are spaced apart from one another, as shown in FIG. 2. To unlock the door 30, the nose portions 46a, 46b are manually squeezed together so as to retract the pins 42a, 42b from the openings in the outer shell 100 (FIG. 3). The door 30 may then be pivoted open about pivot axis D.

As shown in FIGS. 2 and 3, in addition to the door latch 40, the door 30 may also comprise a securing member 50. The securing member 50 prohibits accidental unlocking of the door 30. The securing member 50 comprises a flap 52 which is positioned near a second longitudinal end 30b of the door 30 opposite the first longitudinal end 30a. The flap 52 is hingedly connected to the door 30 at its outer side 30c and pivotable about a pivot axis F. The flap 52 has a rectangularly shaped bulge portion 54 directed towards the outer side 30c.

In the locked and secured state of the door 30, the flap 52 abuts the outer side 30c of the door 30 and the bulge portion 54 is received within a space formed between the nose portions 46a, 46b. When the bulge portion 54 is inserted between the nose portions 46a, 46b, the nose portions 46a, 46b cannot be moved towards each other such that the pins 42a, 42b are prevented from retracting. Hence, the door 30 securely remains in its locked state. To release the securing member 50, the flap 52 is pivoted about pivot axis F so as to disengage the bulge portion 54 from the nose portions 46a, 46b. The nose portions 46a, 46b are now free to be pushed towards each other so as to unlock the door 30. A lock indicator 56 with a color coding may be provided to indicate visually to a caretaker whether the door 30 is in its unlocked or locked state.

As shown in FIG. 4, a food trough 58 and a water tank 60 are attached to an inner side 30d of the door 30. Both the food trough 58 and the water tank 60 have an outside access for filling. The food trough 58 may be replenished via a second aperture 62 provided in the door 30 near the bottom wall portion 200. The water tank 60 may be replenished via a replenishment opening 118 provided in the top portion 102 of the pet container 10. The replenishment opening 118 is covered with a lid 120. The lid 120 is hingedly connected to the front wall portion 110. When the door 30 is in its closed state, the replenishment opening 118 is in fluid communication with the water tank 60 via a connection member 60a of the water tank 60. The lining 116 may serve as a sealing means for the connection member 60a so as to prevent water from leaking at an interface between the connection member 60a and the replenishment opening 118.

With continued reference to FIG. 4, a tray 64 may be inserted into the pet container 10. The tray 64 is preferably made from metal, such as stainless steel or aluminum. The tray 64 may add rigidity to the pet container 10. Further, an upper surface 64a of the tray 64 may be coated with an anti-slip material. An absorbent bedding (not shown) may be placed on the upper surface 64a. The absorbent bedding may neutralize any odor and/or release a pleasant scent for the pet to feel as comfortable as possible for long durations of time.

The pet container 10 may further be equipped with a wireless device (not shown). The wireless device may perform a variety of functions, such as tracking the location of the pet container 10. The information may be transmitted to a receiving device (not shown), such as a mobile phone. The wireless device may be inserted into a slot 204 provided in the climate compartment 202 (FIG. 1). The slot 204 is sufficiently sealed off from the remainder of the climate compartment 202 so as not to get in contact with water, e.g., water condensing on the cooling or heating medium M. The wireless device may also acquire information on other parameters, such as the temperature, the pressure, the humidity and/or on the filling level of the food trough 58 and the water tank 60 in the pet chamber 20. Additionally or alternatively, the pet itself may be equipped with a collar tag, which monitors the pet's location during transit.

Figure 6:
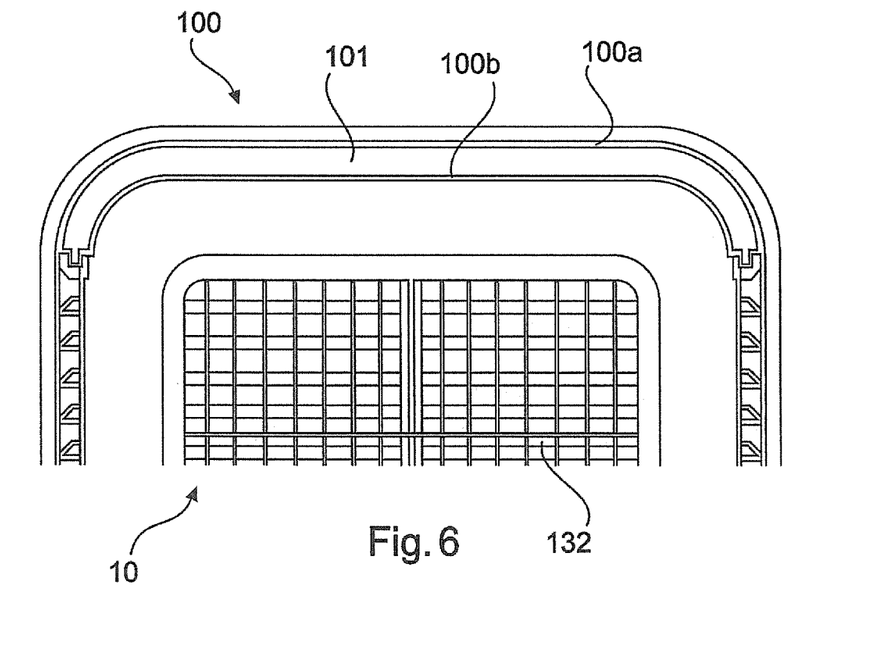
FIG. 6 shows a cross-sectional view of a preferred construction of the outer shell of a pet container of the present invention.

With reference to FIG. 6, the outer shell 100 may at least partly be formed of a multi-layered wall. For instance, the outer shell 100 may be double-walled and formed of a first wall 100a and a second wall 100b defining a space 101 therebetween. The space 101 defined between the first and second walls 100a, 100b may be filled with a gas, such as air, or foam. A multi-layered wall adds rigidity to the pet chamber 10. Further, a pet container 10 formed of a multi-layered outer shell 100 has an improved heat-insulating property as compared to a pet chamber 10 formed of a single-walled outer shell 100.

A second embodiment of a pet container will now be described with reference to FIGS. 7 to 11.

The pet container of the second embodiment is similar to the pet container of the first embodiment, discussed in connection with FIGS. 1 to 6, and only the differences between the two embodiments will be discussed below.

Instead of the hinged cover 158 for closing the climate compartment 202, the pet container 10 of the second embodiment is provided with two drawers or trays 300 which are configured to be slid into the climate compartment 202. When inserted, the trays 300 are arranged side-by-side. More specifically, each of the trays 300 is of a rectangular shape with two opposing larger sides having a length approximately equal to, but less than, the width of the pet container 10 and two opposing smaller sides, orthogonal to the larger sides, having a length of approximately half, but less than, the width of the orifice 156 leading to the climate compartment 202. It will be appreciated that less or more than two trays 300 can be used. Further, the trays 300 can have any suitable shape and the present invention is not limited to rectangular trays.

The trays 300 have a cover plate 302 on one of the two smaller sides. The cover plate can be used to close off the climate compartment 202 once the trays 300 are in the inserted position. The cover plate 302 has on its outer side facing away from the tray 300 a recessed grip 304 so that a pet owner or other person can pull out the tray 300 from the climate compartment 202 and replace the cooling or heating medium M, for instance. The bottom wall portion 200 may be provided with guiding structure for the trays 300 which can facilitate insertion and also prevent undesired displacement of the trays 300 once inserted.

In the illustrated embodiment, each tray 300 is partitioned into five compartments of equal size. However, more or less compartments are possible, and the compartments can differ in size. Each compartment can accommodate a cooling or heating medium M. The partitioning walls can be made of an insulating foam, but it will be appreciated that other materials may be equally as desirable.

Figure 7:
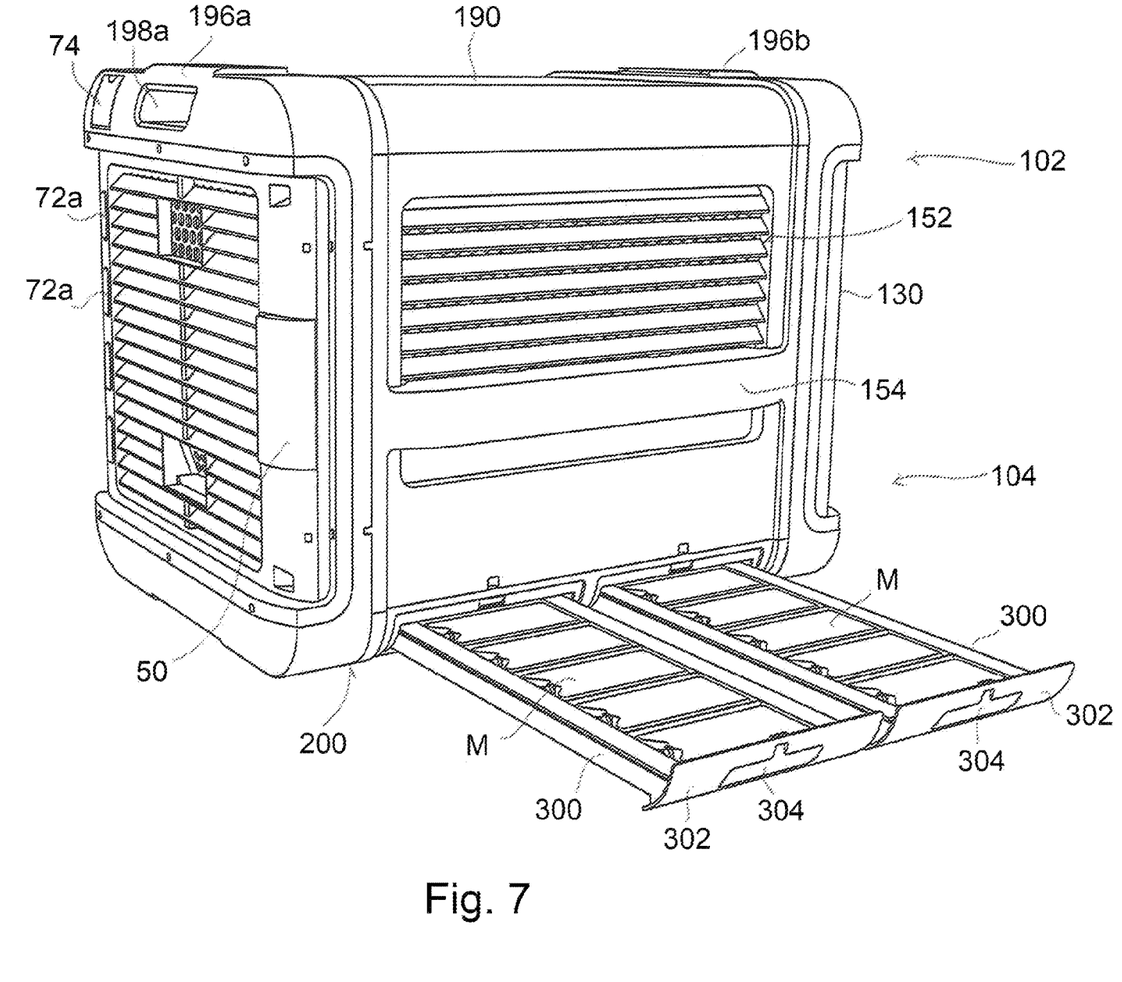
FIG. 7 shows a pet container according to a second embodiment of the present invention with the door in its closed and securely locked state.
Figures 8, 9:
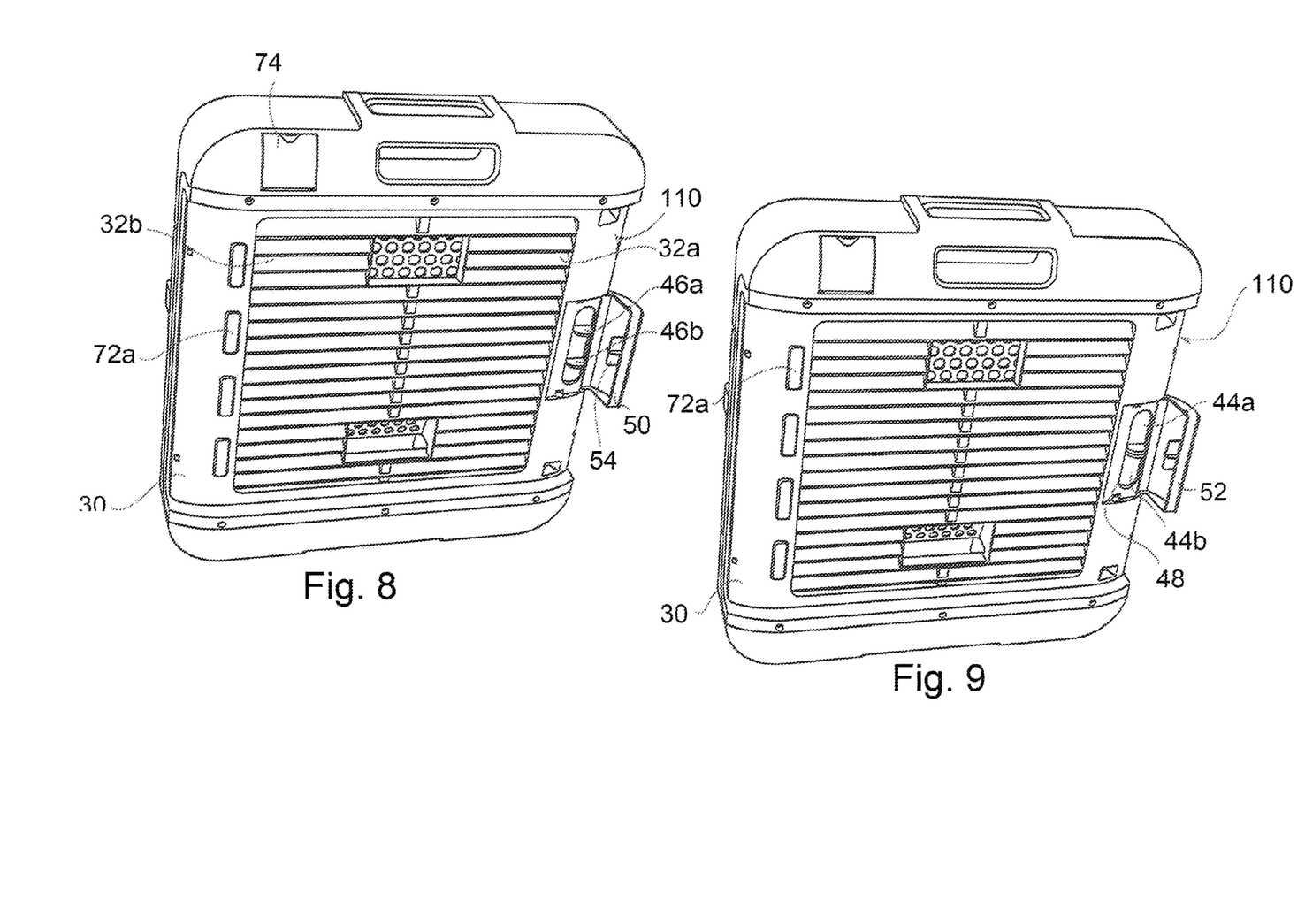
FIG. 8 shows the pet container of FIG. 7, wherein the door is in its closed and unsecured locked state.
FIG. 9 shows the pet container of FIG. 7, wherein the door is in its closed and unlocked state.

As can be seen from FIGS. 7 to 9, the door latch 40 and securing member 50 have been arranged to reduce the number of parts protruding beyond the outer side 30c of the door 30.

Figure 10:
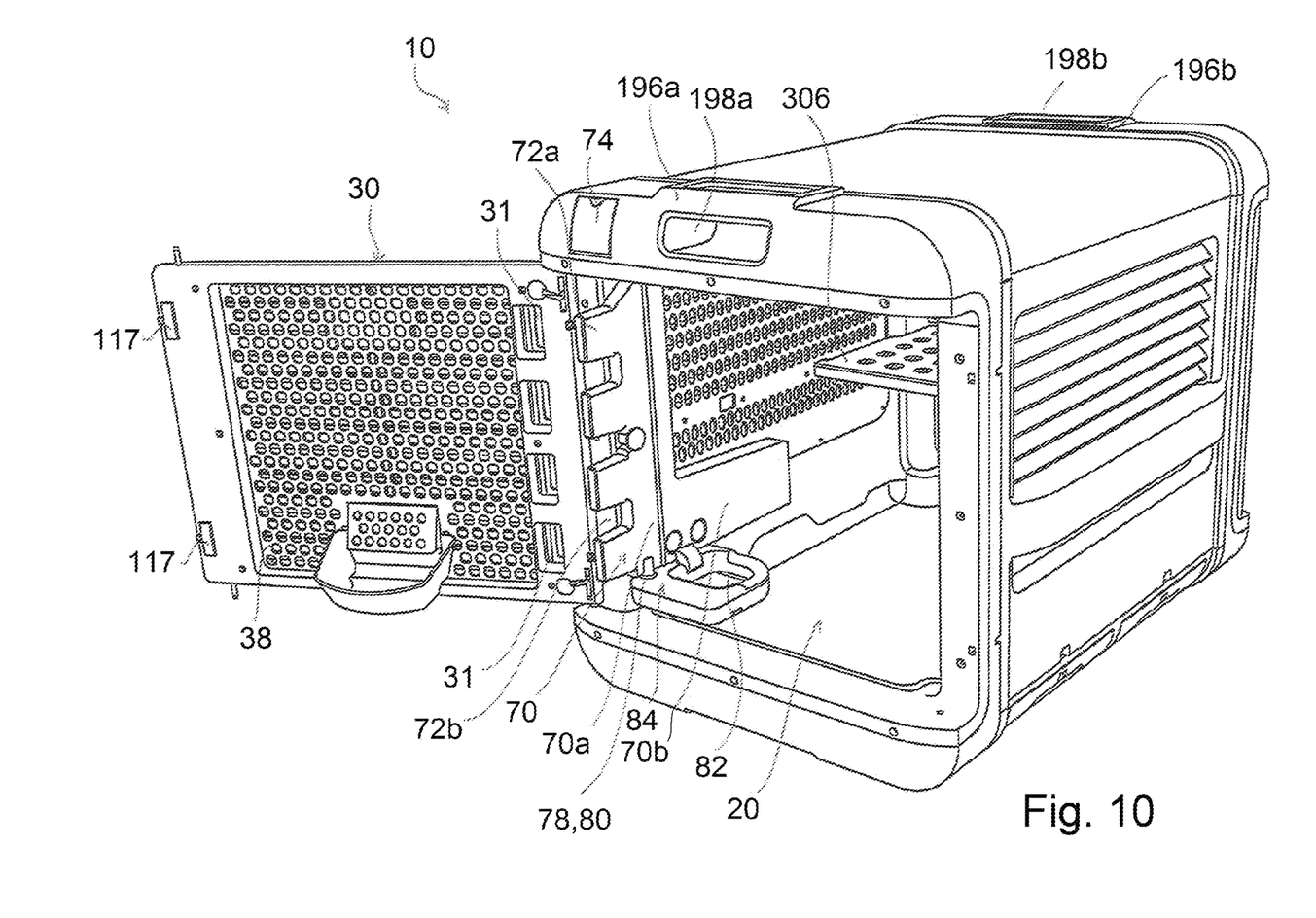
FIG. 10 shows the pet container of FIG. 7 in a first perspective, with the door in its open state.

With reference to FIG. 10, a water tank 70 is provided inside the pet chamber 20 and substantially L-shaped with a vertically extending portion 70a and a horizontally extending portion 70b. Along the length of the vertical portion 70a, a plurality of protrusions 72a is arranged, with valleys 72b formed between adjacent protrusions 72a. The protrusions 72a extend in a direction opposite to the horizontal portion 70b and, when the door 30 is in the closed state, the protrusions 70a are configured to extend into respective holes 31 in the door 30, such that the protrusions 70a are visible from the outside of the pet container 10. In this way, provided the water tank 70 is made of a transparent material, the fluid level in the water tank 70 can easily be checked by a glance at the water level scale formed by the plurality of protrusions 72a.

Any number of protrusions 72a and respective holes 31 is possible. Also a single protrusion 72a without a corresponding valley 72b may be considered. The hole 31 would then be a vertically extending slit in the door 30, which must be small enough to prohibit escape of a pet kept within the pet chamber 20. Instead of being substantially L-shaped, it will be appreciated that the water tank 70 may have any other suitable shape.

The protrusions 72a have a trapezoidal shape and taper in a direction opposite to the direction of extension of the horizontal portion 70b. It will be appreciate, however, that other shapes, such as a rectangular shape, are also possible. The taper of the protrusions 72a facilitates insertion of the protrusions 72a into the respective holes 31 in the door 30.

The water tank 70 further comprises a dispenser 74 coupled to the free end of the vertical portion 70a. The dispenser 74 is configured to guide fluid from the dispenser 74 into the vertical portion 70a of the water tank 70. In the illustrated embodiment, the dispenser 74 is formed as a slide-out tray and extends through the respective replenishing opening 118 in the top portion 102 of the outer shell 100, above the door 30. The water tank 70 allows water to be topped up irrespective of whether the door 30 is in the open or closed state.

Figure 12:
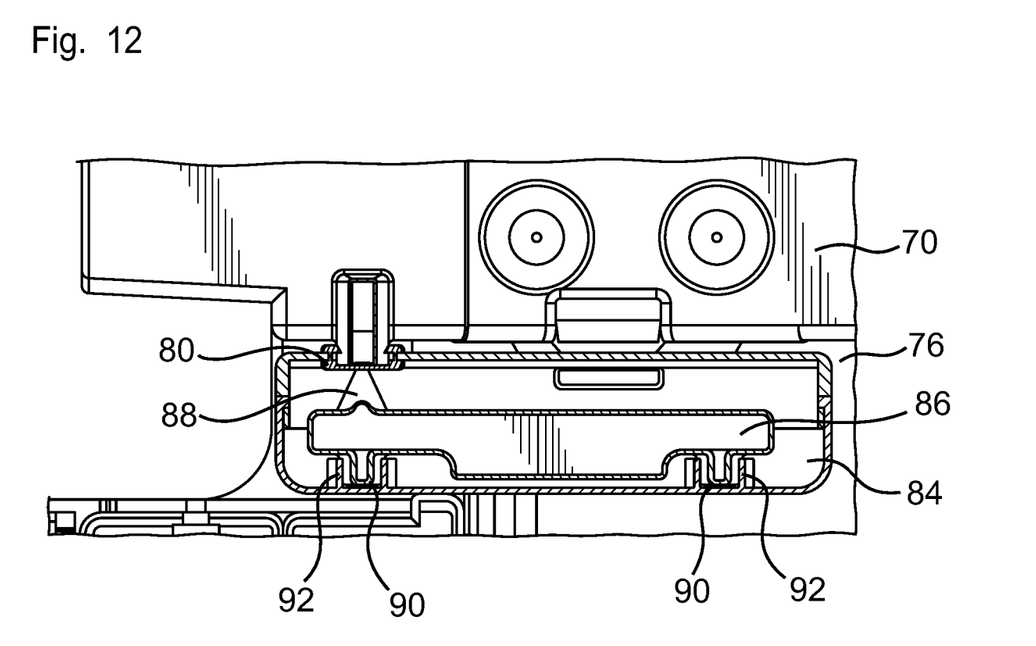
FIG. 12 shows a valve provided in the water tray which controls the maximum depth of water in the water tray.

The pet container 10 is further equipped with a water tray 76 arranged below the water tank 70. As shown in FIG. 12, the water tray 76 has an open water reservoir 82 for a pet to drink water from and a float chamber 84 configured to accommodate a float body 86. The water tank 70 is in fluid communication with the water tray 76 via an opening 78 in the water tray 76. More specifically, the opening 78 provides fluid communication between the water tank 70 and the float chamber 84, which in turn is in fluid communication with the water reservoir 82. The opening 78 may be sealed with a sealing element 80, which may be made of rubber, to prevent water leakage.

In the illustrated embodiment of FIG. 12, the float body 86 has elongated shape with a conic protrusion 88 configured to cooperate with the opening 78 in the water tray 76. It will be appreciated that the float body may have any other suitable shape. The opening 78 and the conic protrusion 88 form a valve and control the maximum water level in the water tank 70. When the water level in the water tank 70 is at a predefined maximum water level, the valve is in a closed state where the conic protrusion 88 of the float body 86 seals the opening 78 of the water tray 76 such that no water can flow from the water tank 70 into the water tray 76. When the water level in the water tray 76 drops below the predefined maximum level, the valve moves into an open state where the float body 86, floating on the water in the float chamber 84, also drops so that the conic protrusion 88 opens the opening 78, allowing water from the water tank 70 to refill the water tray 76 until the predefined maximum level is reached and the conic protrusion 88 of the float body 86 closes off the opening 78.

In order to prevent the float body 86 from tilting within the float chamber 84, the float body 86 further has two cylindrical protrusions 90 received within guiding receptacles 92 provided at the bottom surface of the water tray 76. Guided by the guiding receptacles 92, the float body 86 moves up and down in the float chamber 84 a controlled manner. It will be appreciated that any suitable number and shape of protrusions 90 and corresponding guiding receptacles 92 may be used.

With continued reference to FIG. 10, the pet container 10 of the second embodiment lacks the handle 192. The outer shell 100 comprises two strap handles 196a, 196b formed at the top portion 102 of the outer shell 100 on opposite sides by a passageway 198a, 198b extending from a top wall portion 190 to the front or rear wall portions 110, 130, respectively. The strap handles 196a, 196b allow a strap or other tightening means, such as a band or rope, to be inserted through the passageways 198a, 198b so as to strap down the pet container 10.

Figure 11:
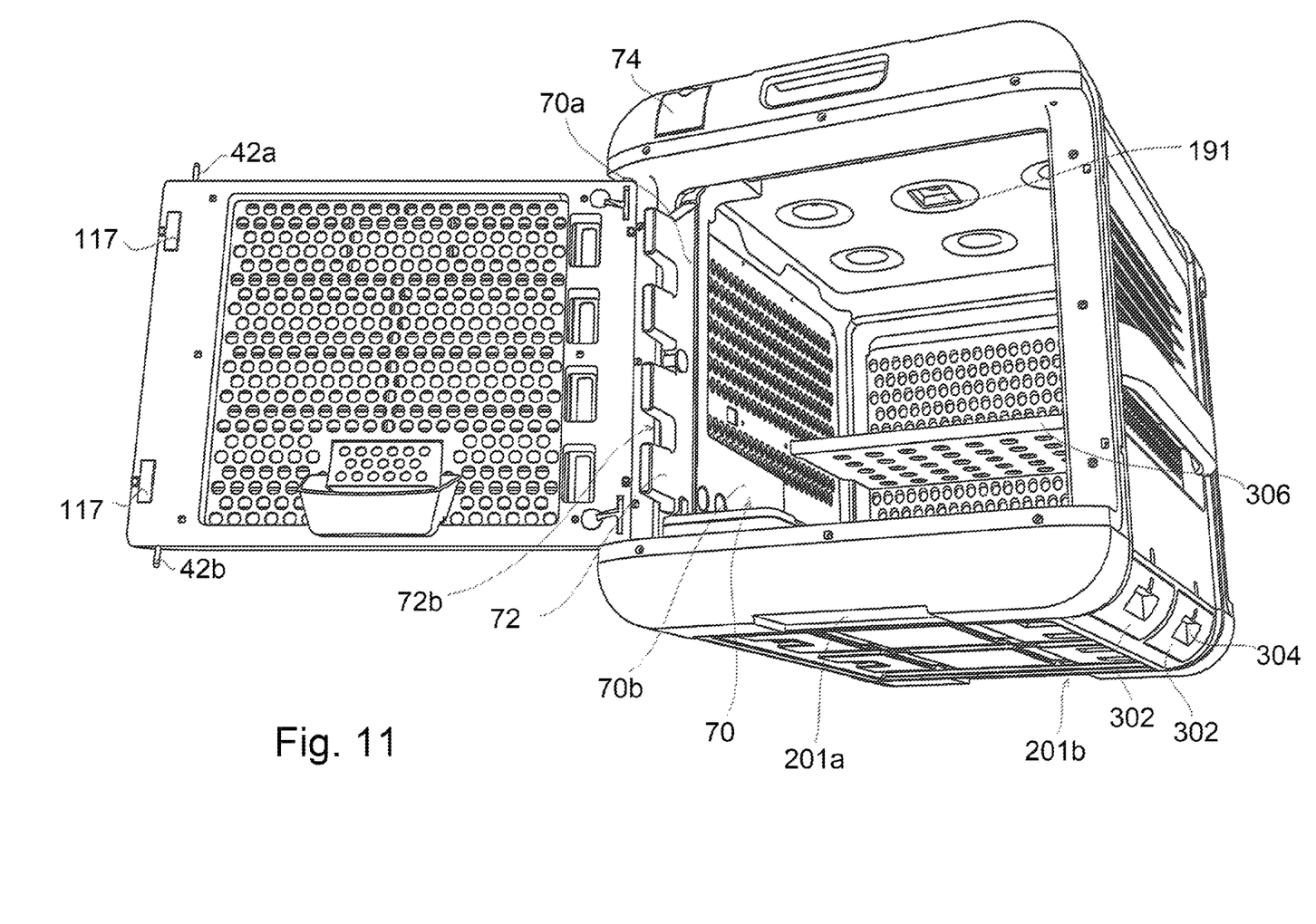
FIG. 11 shows the pet container of FIG. 7 in a second perspective, with the door in its open state.

In the illustrated embodiment in FIG. 11, the bottom surface of the bottom wall portion 200 may be provided with recesses 201a, 201b corresponding to the strap handles 196a, 196b, which are slightly raised. When two pet chambers 10 are stacked on top of each other, the strap handles 196a, 196b can cooperate with the recesses 201a, 201b to prevent any undesired shifting motion of the top pet chamber 10.

As can be seen in FIGS. 10 and 11, a partition member 306 is inserted in the pet chamber 20. The partition member 306 can be used to make the pet container 10 fit for differently sized pets.

Further, the mesh 38 which at least in part covers the interior of the pet chamber 20 is made of rigid plastic. Preferably, the mesh 38 is molded together with the ventilation louvers 32, 132, 152, 172.

Instead of the lining 116, bumpers 117 are provided on the inner side 30d of the door 30 so as to eliminate or at least reduce rattling noises when the door 30 is in the closed state.

FIG. 11 also shows an indentation 191 configured for housing a wireless tracking device.

While the present invention has been illustrated by a description of preferred embodiments and while these embodiments have been described in some detail, it is not the intention of the Applicants to restrict or in any way limit the scope of the appended claims to such detail. Additional advantages and modifications will readily appear to those skilled in the art. The various features and concepts of the invention may be used alone or in any combination depending on the needs and preferences of the operator. This has been a description of the present invention, along with the preferred methods of practicing the present invention as currently known. However, the invention itself should only be defined by the appended claims.

LIST OF REFERENCE SIGNS

D pivot axis
F pivot axis
M cooling or heating medium
10 pet container
20 pet chamber
30 door
31 holes
30a, 30b first and second longitudinal ends
30c, 30d outer and inner sides
32 ventilation louver
32' ventilation arrangement
32a slats
32b slits
34, 36 inner and outer panels
34a, 36a ventilation holes
38 mesh
40 door latch
42a, 42b pin
44a, 44b actuating member
46a, 46b nose portion
48 first aperture
50 securing member
52 flap
54 bulge portion
56 lock indicator
58 food trough
60 water tank
60a connection member
62 second aperture
64 tray
70 water tank
70a, 70b vertically and horizontally extending portions
72a, 72b protrusions and valleys
74 dispenser
76 water tray
78 opening
80 sealing element
82 water reservoir
84 float chamber
86 float body
88 conic protrusion
90 cylindrical protrusion
92 guiding receptacle
100 outer shell
100a, 100b first and second walls
101 space
102 top portion
104 bottom portion
110 front wall portion
112 opening
114 rim
116 lining
117 bumpers
118 replenishment opening
120 lid
130 rear wall portion
132 ventilation louver
134 fringe
150 first side wall portion
152 ventilation louver
154 spacer bar
156 orifice
158 lid
170 second side wall portion
172 ventilation louver
190 top wall portion
191 indentation
192 handle
194 depression
196a, 196b strap handles
198a, 198b passageways
200 bottom wall portion
201a, 201b recesses
202 climate compartment
204 slot
210 front circumferential section
212 intermediate circumferential section
214 rear circumferential section
300 tray
302 cover plate
304 grip
306 partition member

The invention claimed is:

1. A pet container for transporting pets, comprising:
an outer shell having a top portion and a bottom portion, wherein the outer shell defines a pet chamber for accommodating a pet, wherein the outer shell has an opening for providing access to the pet chamber and a door for opening and closing the opening;
a water tank inside the pet chamber; and
a climate compartment for receiving a cooling or heating medium,
wherein the climate compartment is provided below the pet chamber and has an orifice for horizontally inserting a cooling or heating medium into and for removing the cooling or heating medium from the climate compartment,
wherein the door has an open state and a closed state, and
wherein the water tank has at least one protrusion configured to be received in a hole in the door when the door is in the closed state so as to allow reading a fluid level in the water tank.

2. The pet container of claim 1, wherein the outer shell has a front wall portion, a rear wall portion, a first side wall portion, a second side wall portion, a top wall portion, and a bottom wall portion, and wherein the orifice opens towards one of the first and second side wall portions.

3. The pet container of claim 1, wherein the climate compartment is adapted to receive at least one tray, the at least one tray being configured to accommodate the cooling or heating medium.

4. The pet container of claim 3, wherein the at least one tray has a cover plate for covering the orifice of the climate compartment when the at least one tray is received within the climate compartment.

5. The pet container of claim 1, wherein the door has a locked state and an unlocked state, wherein the pet container comprises a lock indicator to indicate whether the door is in the locked state or unlocked state.

6. The pet container of claim 1, wherein the door comprises a spring loaded door latch for transferring the door between a locked state and an unlocked state, wherein the door latch comprises:
a pair of pins, each pin being provided with an actuating member having a nose portion, wherein, when the door is in the locked state, the pins protrude beyond the door so as to engage with the outer shell and the nose portions are spaced apart from one another; and
a securing member for securing the door in the locked state, the securing member comprising a flap hingedly connected to the door, the flap having a bulge portion configured to be received between the nose portions in the locked state of the door so as to secure the door in the locked position.

7. The pet container of claim 1, wherein the door has an open state and a closed state, and wherein a plurality of bumpers are arranged on an inner side of the door to prevent vibrational noise of the door in the closed state.

8. The pet container of claim 1, further comprises a water tank, the water tank comprising a dispenser slidably received in a replenishment opening in the top portion of the outer shell, and the dispenser being configured for allowing replenishment of the water tank from outside the pet container.

9. The pet container of claim 1, further comprises a water tank and a water tray at least partially inside the pet chamber, the water tank being in fluid communication with the water tray, wherein a valve is configured to control a maximum water level in the water tray.

10. The pet container of claim 9, wherein the water tray comprises an opening configured to fluidly connect the water tank with the water tray, and a float body configured to cooperate with the opening so as to form the valve.

11. The pet container of claim 10, wherein the float body has a plurality of protrusions movably received within guiding receptacles of the water tray.

12. The pet container of claim 1, wherein the outer shell has a ventilation arrangement comprising an inner panel and an outer panel, each of the inner and outer panels having a plurality of ventilation holes, wherein the plurality of ventilation holes of the inner panel overlap with the plurality of ventilation holes of the outer panel to an extent of less than 30%.

13. The pet container of claim 1, comprising at least one partition member that is insertable into the pet chamber.

14. The pet container of claim 1, wherein the outer shell is at least partially formed of a multi-layered wall comprising a first wall and a second wall, wherein the first and second walls define a space therebetween.

* * * * *